US009041675B2

(12) United States Patent
Cho et al.

(10) Patent No.: US 9,041,675 B2
(45) Date of Patent: May 26, 2015

(54) SMART WATCH FOR GENERATING TACTILE FEEDBACK AND METHOD OF CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 13/955,947

(22) Filed: Jul. 31, 2013

(65) Prior Publication Data

US 2015/0009784 A1 Jan. 8, 2015

(30) Foreign Application Priority Data

Jul. 4, 2013 (KR) ........................ 10-2013-0078240

(51) Int. Cl.

| | |
|---|---|
| ***G06F 3/041*** | (2006.01) |
| ***G04G 21/08*** | (2010.01) |
| ***G04G 9/00*** | (2006.01) |
| ***G08B 6/00*** | (2006.01) |

(52) U.S. Cl.

CPC .............. *G04G 21/08* (2013.01); *G04G 9/0064* (2013.01); *G08B 6/00* (2013.01)

(58) Field of Classification Search

USPC .................................. 345/156, 173, 204, 690

See application file for complete search history.

(56) References Cited

U.S. PATENT DOCUMENTS

| | | | | |
|---|---|---|---|---|
| 5,940,349 | A | 8/1999 | Stewart | |
| 7,050,360 | B2 | 5/2006 | Saito | |
| 7,079,454 | B2 | 7/2006 | Wellen | |
| 8,827,906 | B2 * | 9/2014 | Yuen et al. | 600/301 |
| 2003/0181116 | A1 | 9/2003 | Van Heerden et al. | |
| 2006/0092177 | A1 * | 5/2006 | Blasko | 345/619 |
| 2010/0331145 | A1 | 12/2010 | Lakovic et al. | |
| 2011/0294489 | A1 * | 12/2011 | Wang et al. | 455/419 |
| 2012/0194976 | A1 | 8/2012 | Golko et al. | |
| 2013/0171599 | A1 * | 7/2013 | Bleich et al. | 434/247 |

FOREIGN PATENT DOCUMENTS

| | | | |
|---|---|---|---|
| JP | 2011-203277 | A | 10/2011 |
| KR | 20-2009-0002172 | U | 3/2009 |

* cited by examiner

*Primary Examiner* — Ricardo L Osorio

(74) *Attorney, Agent, or Firm* — Birch, Stewart, Kolasch & Birch, LLP

(57) ABSTRACT

A method of controlling a smart watch including a case and a band connected to the case is disclosed. The method includes displaying digital content on a display unit provided on a front surface of the case, detecting a length of a non-displayed portion of the digital content on the display unit, and generating first tactile feedback corresponding to the length of the non-displayed portion of the digital content on the display unit on a back surface of the band.

24 Claims, 11 Drawing Sheets

SMART WATCH FOR GENERATING TACTILE FEEDBACK AND METHOD OF CONTROLLING THE SAME

Pursuant to 35 U.S.C. §119(a), this application claims the benefit of Korean Patent Application No. 10-2013-0078240, filed on Jul. 4, 2013, which is hereby incorporated by reference as if fully set forth herein.

BACKGROUND OF THE INVENTION

1. Field of the Invention

The disclosure relates to a smart watch, and more particularly, to a smart watch for generating tactile feedback according to displayed content.

2. Discussion of the Related Art

Along with the development of small-sized digital devices, a digital watch has been developed as a smart watch that not only marks time but also displays digital content or transmits notification of an external device connected to the smart watch via wireless communication. The smart watch may display digital content, a length of which exceeds that of a display region. The smart watch may display only a portion of digital content and scroll through digital content in order to display the remaining portion.

Thus, a smart watch needs to notify a user how long remaining non-displayed portions of digital content other than a displayed portion of the digital content are present. A conventional scroll bar needs to be displayed together with digital content, and thus, is not suitable for a smart watch with a limited small display region.

SUMMARY OF THE INVENTION

Accordingly, the disclosure is directed to a smart watch for generating tactile feedback and a method of controlling the same that substantially obviate one or more problems due to limitations and disadvantages of the related art.

An object of the disclosure is to provide a smart watch for generating tactile feedback corresponding to digital content and a method of controlling the same. In particular, according to the disclosure, the smart watch may generate tactile feedback on a band portion to allow a user to predict the length of digital content.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a smart watch including a case and a band connected to the case includes a display unit provided on a front surface of the case and configured to display digital content, a sensor unit configured to detect control input for control of the digital content, a tactile feedback unit configured to generate tactile feedback on the display unit and the band, and a controller configured to control the display unit, the sensor unit, and the tactile feedback unit, wherein the controller generates first tactile feedback corresponding to a length of the digital content on a back surface of the band.

In another aspect of the disclosure, a method of controlling a smart watch including a case and a band connected to the case includes displaying digital content on a display unit provided on a front surface of the case, detecting a length of a non-displayed portion of the digital content on a display unit, and generating first tactile feedback corresponding to the length of the non-displayed portion of the digital content on the display unit on a back surface of the band.

It is to be understood that both the foregoing general description and the following detailed description of the disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Embodiments will be described below in detail with reference to the attached drawings, which should not be construed as limiting the embodiments.

Although the terms used in the disclosure are selected from generally known and used terms while considering functions of the disclosure, they may vary according to intention or customs of those skilled in the art or to emergence of new technology. Some of the terms mentioned in the description of the disclosure may have been selected by the applicant at his or her discretion, and in such cases the detailed meanings thereof will be described in relevant parts of the description herein. Thus, the terms used in this disclosure should be interpreted based on the substantial meanings of the terms and the whole content of this disclosure rather than their simple names or meanings.

Throughout this disclosure, technical features applied to a smart watch may be applied to a wearable device that is attached to a user body and transmits tactile feedback. This disclosure describes technical features of a general wearable device as well as a smart watch.

Figure 1:
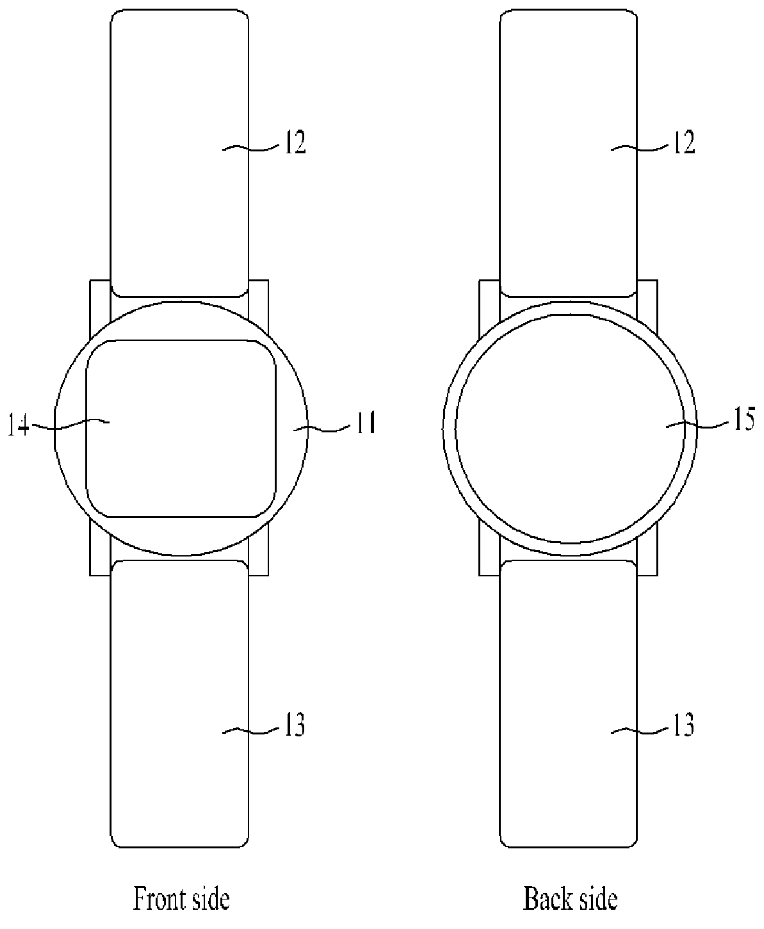
FIG. 1 is a diagram illustrating a smart watch according to an embodiment of the disclosure.

FIG. 1 is a diagram illustrating a smart watch according to an embodiment of the disclosure. A left diagram of FIG. 1 illustrates a front side of the smart watch. The smart watch may include a case 11, and a first band 12 and a second band 13 that are connected to upper and lower portions of the case 11, respectively. In some embodiments, the first band 12 and the second band 13 may be connected to each other to constitute a single band.

The case 11 of the smart watch may include at least one of a display unit, a tactile feedback unit, a controller, and a sensor unit. The smart watch may display digital content via the display unit. In addition, the smart watch may detect control input generated by touching the display unit to generate tactile feedback via the sensor unit.

Each of the first band 12 and the second band 13 may include the sensor unit and the tactile feedback unit, which are formed on a front surface of each of the first band 12 and the second band 13. The smart watch may detect control input generated by touching a front surface of a band via the sensor unit. In addition, the smart watch may generate tactile feedback on the front surface of the band in response to the detected control unit via the tactile feedback unit.

A right diagram of FIG. 1 illustrates a back side of the smart watch. The smart watch may include the first band 12, the second band 13, and a case back 15, which are formed on the back side of the smart watch. The case back 15 may protect components included in the case 11 of the smart watch from external moisture or pollutants.

Each of the first band 12 and the second band 13 may include a tactile feedback unit that is formed on a back surface of each of the first band 12 and the second band 13. The smart watch may generate tactile feedback on back surfaces of bands as digital content displayed on the display unit is controlled, which will be described with regard to embodiments of the disclosure with reference to FIGS. 3 through 6.

In some embodiments, the smart watch may generate tactile feedback on the case back 15 in response to control input generated by touching a display unit 14. According to another embodiment of the disclosure, the smart watch may generate tactile feedback on the case back 15 in response to control input detected from a front surface of a band or in an adjacent region of the smart watch, which will be described as embodiments of the disclosure with reference to FIGS. 7 through 9.

Figure 2:
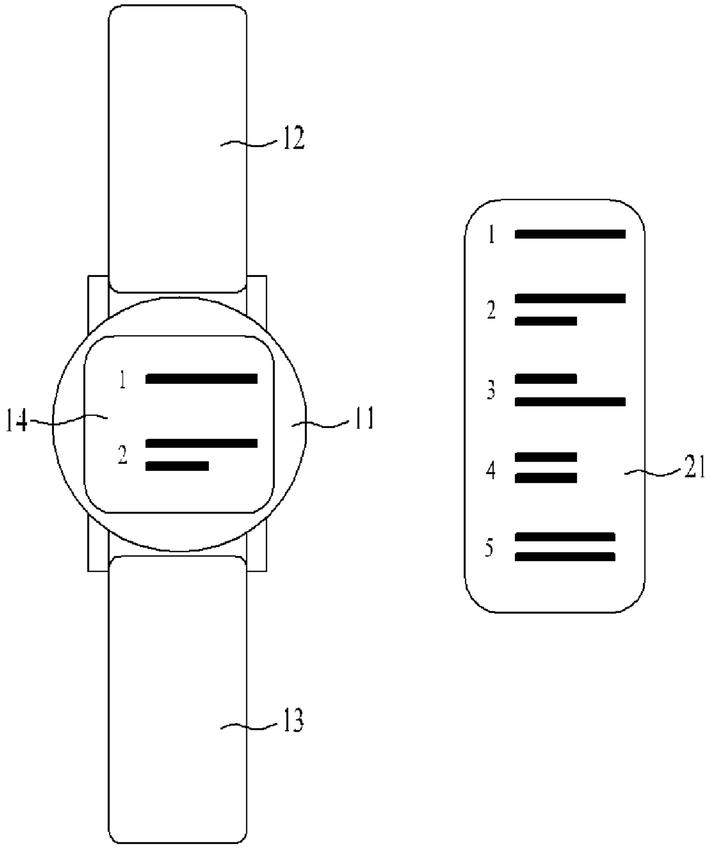
FIG. 2 is a diagram illustrating a smart watch and digital content according to an embodiment of the disclosure.

FIG. 2 is a diagram illustrating a smart watch and digital content according to an embodiment of the disclosure. A left diagram of FIG. 2 illustrates the smart watch and a right diagram of FIG. 2 illustrates digital content 21.

The smart watch may include the case 11, the first band 12 connected to an upper end of the case 11, the second band 13 connected to a lower end of the case 11, and the display unit 14. The smart watch may display the digital content 21, a length of which exceeds that of the display unit 14. As illustrated in a left diagram of FIG. 2, the smart watch may display a portion of digital content on the display unit 14. The digital content 21 may include paragraphs 1 to 5, as illustrated in a right diagram of FIG. 2. The display unit 14 of the smart watch has limited length and width and thus may display only paragraphs 1 and 2. The smart watch may scroll through the displayed digital content 21 to display paragraphs 3 through 5 that are not displayed.

When the smart watch displays only a portion of the digital content 21, a user has a difficulty in knowing how long non-displayed digital content remains. Thus, the smart watch may display an indicator such as a scroll bar, etc. to visually indicate an amount of non-displayed digital content. However, the display unit 14 of the smart watch has an extremely limited area, and thus, it is not appropriate that a separate indicator is further displayed. Thus, hereinafter, a method of providing an indicator to a user in a smart watch using a tactile feedback unit will be described.

Figure 3:
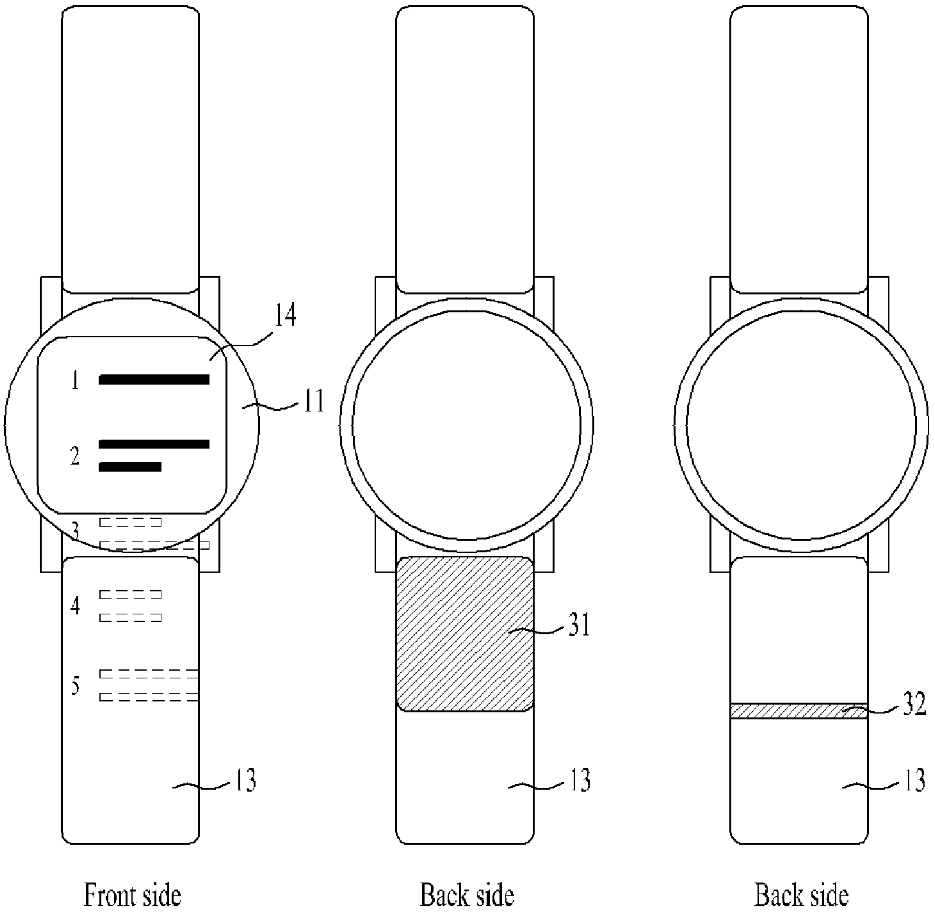
FIG. 3 is a diagram illustrating a method of generating tactile feedback in a smart watch according to an embodiment of the disclosure.

FIG. 3 is a diagram illustrating a method of generating tactile feedback in a smart watch according to an embodiment of the disclosure. In a left diagram of FIG. 3, the smart watch may display digital content on the display unit 14. The digital content may include contents of paragraphs 1 through 5. The smart watch may display only a portion of the digital content, that is, paragraphs 1 and 2 due to a limited area of the display unit 14.

The remaining portions of the digital content, that is, paragraphs 3 through 5 are positioned below paragraphs 2, but are not displayed due to the limited area of the display unit 14. Throughout this disclosure, the remaining portion other than the displayed portion of the digital content may be referred to as a virtual paragraph. That is, the non-displayed portion which can be displayed on the display unit 14 when the smart watch scrolls through digital content according to a control command of a user, may be a virtual paragraph.

In a left diagram of FIG. 3, paragraphs 3 through 5 that are non-displayed virtual paragraphs are indicated by dotted lines. The length of paragraphs 3 through 5 that are virtual paragraphs may correspond to a portion of the second band 13.

The smart watch may generate tactile feedback on a back surface of a band according to a length of the non-displayed virtual paragraphs. As illustrated in an intermediate diagram of FIG. 3, the smart watch may generate tactile feedback from a connection portion between the case 11 and the second band 13 to a region 31 corresponding to the length of the virtual paragraph. The tactile feedback may be generated on a back surface of a band, which contacts a user's skin. The user wearing the smart watch may recognize the generated tactile feedback through the wrist. Thus, the user may recognize that non-displayed digital content, corresponding to the region in which tactile feedback is generated, is present. In this manner, the user may scroll through the displayed paragraphs 1 and 2 to display contents of the non-displayed paragraphs 3 through 5 on the display unit 14.

In some embodiments, as illustrated in a right diagram of FIG. 3, the smart watch may generate tactile feedback in a region 32 corresponding to a lower end of the virtual paragraph. The smart watch may generate tactile feedback in the region 32 of the band corresponding to the lower end of the virtual paragraph. The tactile feedback may be generated on a back surface of the band. The user wearing the smart watch may recognize the generated tactile feedback through the wrist and recognize where a lower end of the non-displayed virtual paragraph is present. Thus, the user may recognize how long remaining content of corresponding digital content that the user does not view is present.

FIG. 3 illustrates a case in which the length of the virtual paragraph is equal to the length of the region in which tactile feedback is generated. However, in some embodiments, the length of the virtual paragraph and the length of the region in which tactile feedback is generated may be enlarged or reduced by a predetermined ratio. That is, when the length of the non-displayed virtual paragraph exceeds the length of the second band, the length of the virtual paragraph may be reduced by a predetermined ratio and tactile feedback may be generated in a region of a band, corresponding to the reduced length of the virtual paragraph. In addition, when the length of the non-displayed virtual paragraph is shorter than the length of the second band, the length of the virtual paragraph may be enlarged by a predetermined ratio and tactile feedback may be generated in a region of a band, corresponding to the enlarged length of the virtual paragraph.

Figure 4:
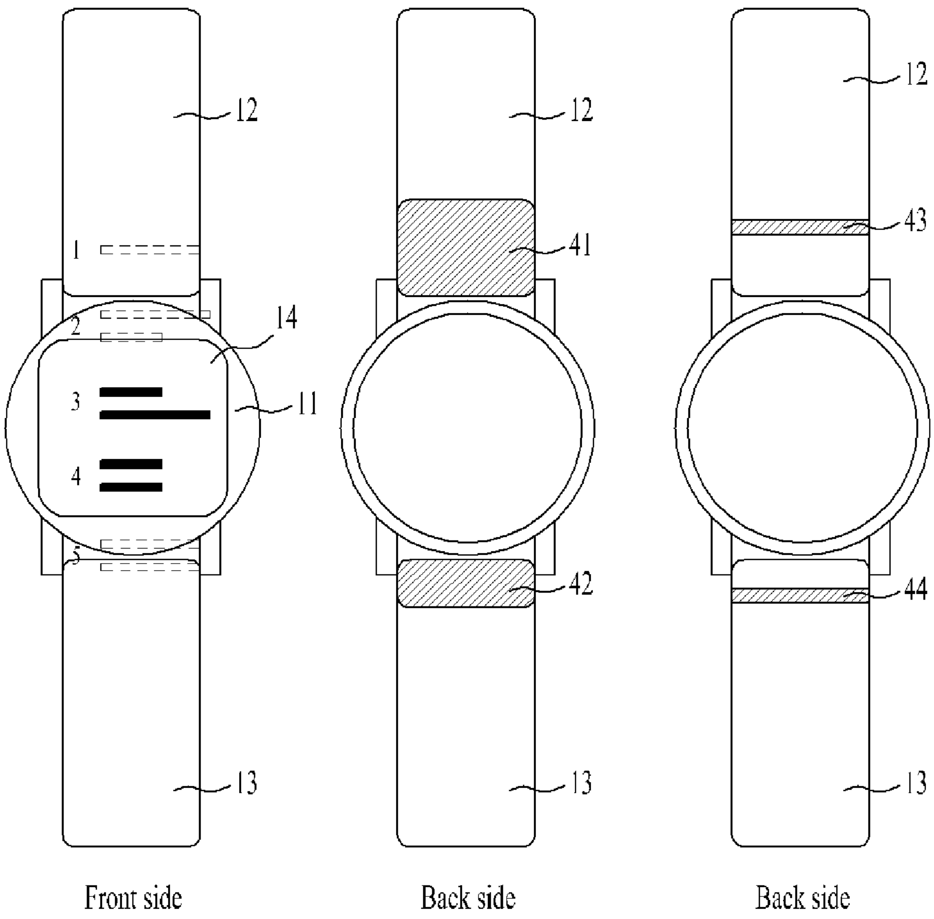
FIG. 4 is a diagram illustrating a method of generating tactile feedback in a smart watch according to another embodiment of the disclosure.

FIG. 4 is a diagram illustrating a method of generating tactile feedback in a smart watch according to another embodiment of the disclosure. A user may scroll through paragraphs 1 and 2 that have been displayed as illustrated in FIG. 3 and the smart watch may display a portion of digital content, which has not been displayed. The smart watch may display a portion of the digital content, that is, paragraphs 3 and 4 due to a limited area of the display unit 14.

The remaining portions of the digital content, that is, paragraphs 1 and 2, and 5 are positioned above paragraph 3 and below paragraph 4, respectively, but are not displayed due to the limited area of the display unit 14. In a left diagram of FIG. 4, paragraphs 1, 2, and 5 that are non-displayed virtual paragraphs are indicated by dotted lines. The length of paragraphs 1 and 2 corresponding to a first virtual paragraph may correspond to a portion of the first band 12. In addition, the length of paragraph 5 corresponding to a second virtual paragraph may correspond to a portion of the second band 13.

The smart watch may generate tactile feedback on back surfaces of the first band 12 and the second band 13 according to a length of the non-displayed virtual paragraphs. As illustrated in an intermediate diagram of FIG. 4, the smart watch may generate tactile feedback from a connection portion between the case 11 and the first band 12 to a region 41 corresponding to the length of the first virtual paragraph. In addition, the smart watch may generate tactile feedback from a connection portion between the case 11 and the second band 13 to a region 42 corresponding to the length of the second virtual paragraph.

The tactile feedback may be generated on a back surface of a band, which contacts a user's skin. The user wearing the smart watch may recognize the generated tactile feedback through the wrist. Thus, the user may recognize that non-displayed digital content, corresponding to the region in which tactile feedback is generated, is present. That is, the smart watch may generate tactile feedback in the region 41 of the first band 12 to inform the user that the non-displayed digital content is present above the displayed digital content. In addition, the smart watch may generate tactile feedback in the region 42 of the second band 13 to inform the user that the non-displayed digital content is also present below the displayed digital content.

In this manner, the user may scroll up or down through the displayed paragraphs 3 and 4 to display the non-displayed paragraphs 1, 2, and 5 on the display unit 14.

In some embodiments, as illustrated in a right diagram of FIG. 4, the smart watch may generate tactile feedback in a region 43 of the first band 12, corresponding to an upper end of the first virtual paragraph, or a region 44 of the second band 13, corresponding to a lower end of the second virtual paragraph. The smart watch may generate tactile feedback in a region of the first band 12 or the second band 13, corresponding to the upper end of the first virtual paragraph or the lower end of the second virtual paragraph. The tactile feedback may be generated on a back surface of the band. The user wearing the smart watch may recognize the generated tactile feedback through the wrist and recognize where the upper end of the non-displayed first virtual paragraph or the lower end of the non-displayed second virtual paragraph is present. Thus, the user may recognize where and how long remaining content of corresponding digital content that the user does not view is present.

FIG. 4 illustrates a case in which the length of the virtual paragraph is equal to the length of the region in which tactile feedback is generated. However, in some embodiments, the length of the virtual paragraph and the length of the region in which tactile feedback is generated may be enlarged or reduced by a predetermined ratio. That is, when the length of the non-displayed first virtual paragraph exceeds the length of the first band 12 in an upward direction or the length of the non-displayed second virtual paragraph exceeds the length of the second band 13 in a downward direction, the length of each virtual paragraph may be reduced by a predetermined ratio and tactile feedback may be generated in a region of each band, corresponding to the reduced length of each virtual paragraph. In addition, when the length of the non-displayed first virtual paragraph is shorter than the length of the first band 12 in an upward direction or the length of the non-displayed second virtual paragraph is shorter than the length of the second band 13 in a downward direction, the length of each virtual paragraph may be enlarged by a predetermined ratio and tactile feedback may be generated in a region of each band, corresponding to the enlarged length of each virtual paragraph.

Figure 5:
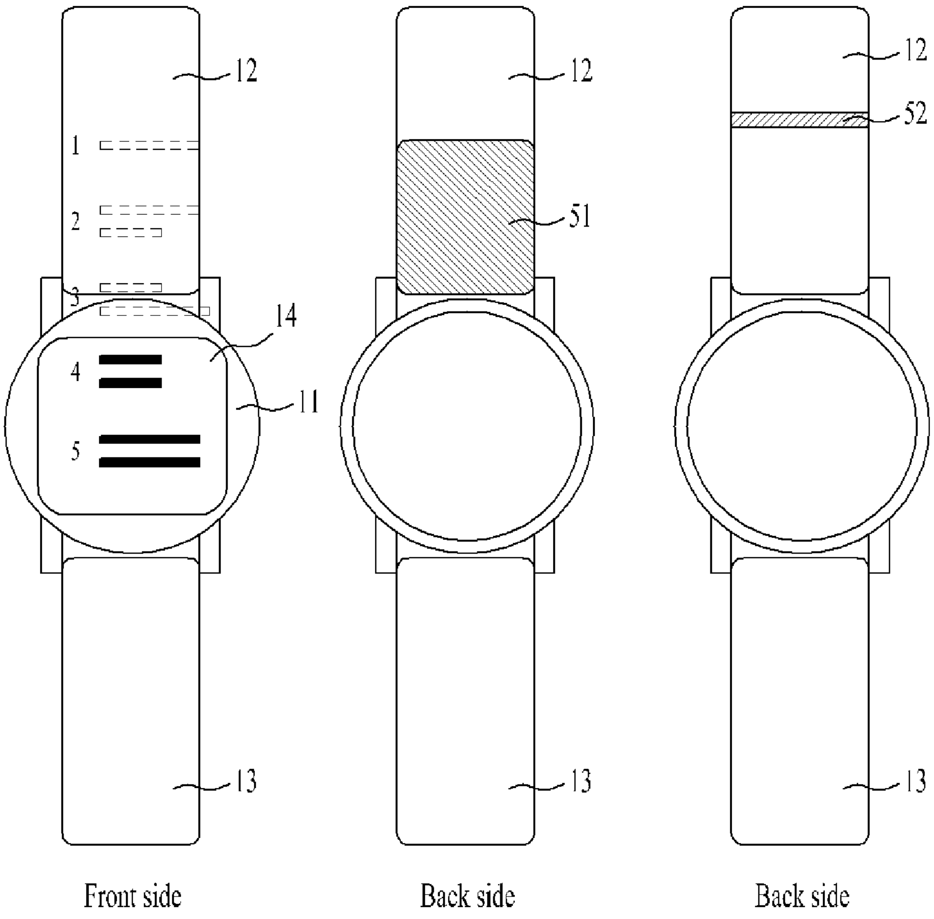
FIG. 5 is a diagram illustrating a method of generating tactile feedback in a smart watch according to another embodiment of the disclosure.

FIG. 5 is a diagram illustrating a method of generating tactile feedback in a smart watch according to another embodiment of the disclosure. A user may scroll through paragraphs 3 and 4 that have been displayed as illustrated FIG. 4 and the smart watch may display a portion of digital content, which has not been displayed. The smart watch may display a portion of the digital content, that is, paragraphs 4 and 5 due to a limited area of the display unit 14.

The remaining portions of the digital content, that is, paragraphs 1 through 3 are positioned above the displayed 4, but are not displayed due to the limited area of the display unit 14. In a left diagram of FIG. 5, paragraphs 1 through 3 that are non-displayed virtual paragraphs are indicated by dotted lines. The length of paragraphs 1 through 3 corresponding to virtual paragraphs may correspond to a portion of the first band 12.

The smart watch may generate tactile feedback on a back surface of a band according to a length of the non-displayed virtual paragraph. As illustrated in an intermediate diagram of FIG. 5, the smart watch may generate tactile feedback from a connection portion between the case 11 and the first band 12 to a region 51 corresponding to the length of the virtual paragraph. The tactile feedback may be generated on a back surface of a band, which contacts a user's skin. The user wearing the smart watch may recognize the generated tactile feedback through the wrist. Thus, the user may recognize that non-displayed digital content, corresponding to the region in which tactile feedback is generated, is present. In this manner, the user may scroll up or down through the displayed paragraphs 4 and 5 to display contents of the non-displayed paragraphs 1 through 3 on the display unit 14.

In some embodiments, as illustrated in a right diagram of FIG. 5, the smart watch may generate tactile feedback in a region 52 corresponding to an upper end of the virtual paragraph. The smart watch may generate tactile feedback in a region of a band corresponding to the upper end of the virtual paragraph. The tactile feedback may be generated on a back surface of the band. The user wearing the smart watch may recognize the generated tactile feedback through the wrist and recognize where the upper end of the non-displayed virtual paragraph is present. Thus, the user may recognize how long contents on which the user scrolls are present in corresponding digital content.

FIG. 5 illustrates a case in which the length of the virtual paragraph is equal to the length of the region in which tactile feedback is generated. However, in some embodiments, the length of the virtual paragraph and the length of the region in which tactile feedback is generated may be enlarged or reduced by a predetermined ratio. That is, when the length of the non-displayed virtual paragraph exceeds the length of the first band 12, the length of the virtual paragraph may be reduced by a predetermined ratio and tactile feedback may be generated in a region of the band corresponding to the reduced length of the virtual paragraph. In addition, when the length of the non-displayed virtual paragraph is shorter than the length of the first band 12, the length of the virtual paragraph may be enlarged by a predetermined ratio and tactile feedback may be generated in a region of the band corresponding to the enlarged length of the virtual paragraph.

Figure 6:
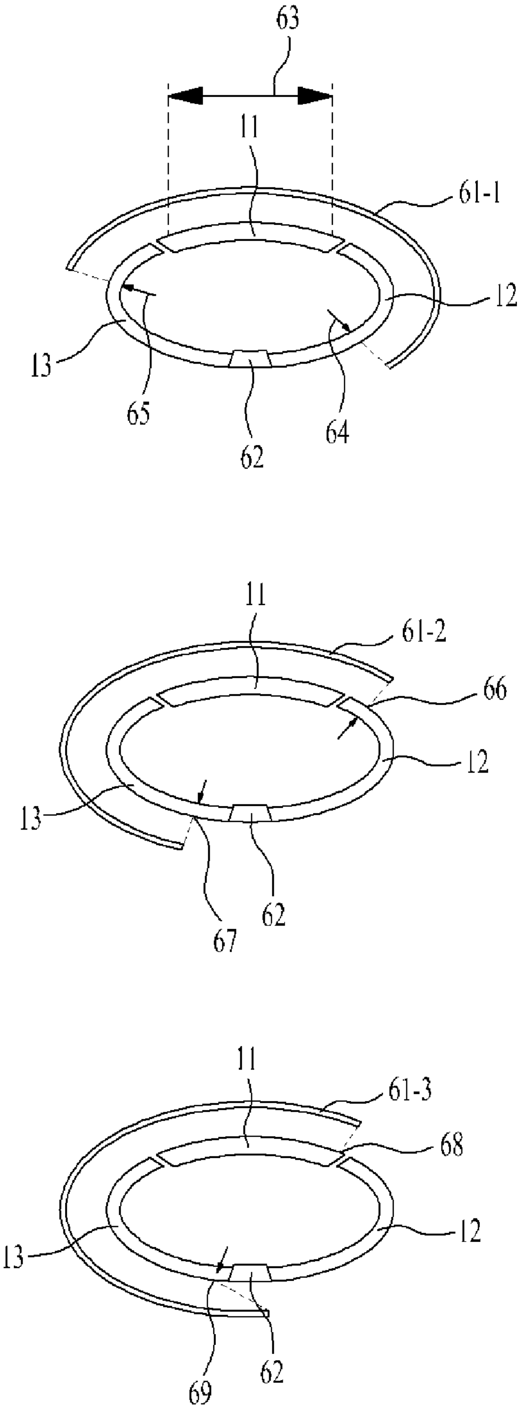
FIG. 6 is a side view illustrating a smart watch and digital content, according to an embodiment of the disclosure.

FIG. 6 is a side view illustrating a smart watch and digital content according to an embodiment of the disclosure. In an upper diagram of FIG. 6, the smart watch may include the case 11, the first band 12, the second band 13, and a buckle 62. The buckle 62 may connect the first band 12 and the second band 13 to each other to hold the smart watch on the user's wrist. The length of digital content 61-1 may exceed that of a display unit of the smart watch. The digital content 61-1 illustrated in FIG. 6 indicates a virtual object and is displayed on a display unit included in the case 11 during actual use. Thus, the smart watch may display only a portion 63 of the digital content 61-1, corresponding to an area of the display unit. That is, the remaining portions other than the displayed portion 63 of the digital content 61-1 may not be displayed and may be in a display standby state. In other words, the remaining portions other than the displayed portion 63 of the digital content 61-1 may correspond to the virtual paragraph that has been described with reference to FIGS. 3 through 5.

The smart watch may generate tactile feedback on a back surface of a band to correspond to the digital content 61-1. The smart watch may generate tactile feedback in a first region 64 of the first band 12, corresponding to an upper end portion of the digital content 61-1. In addition, the smart watch may generate tactile feedback on a second region 65 of the second band 13, corresponding to a lower end portion of the digital content 61-1. The smart watch may generate tactile feedback in a region from a connection portion between the case 11 and the first band 12 to the first region 64. In addition, the smart watch may generate tactile feedback only in the first region 64 to inform the user of a portion of the first band 12, corresponding to an upper end of digital content.

The smart watch may generate tactile feedback in a region from a connection portion between the case 11 and the second band 13 to the second region 65. Alternatively, the smart watch may generate tactile feedback only in the second region 65 to inform the user of a portion of the second band 13, corresponding to a lower end of digital content.

An intermediate diagram of FIG. 6 illustrates a result obtained by scrolling through digital content 61-2 that has been displayed as illustrated in an upper diagram of FIG. 6. When the digital content 61-2 is scrolled, the upper end of the digital content 61-2 may be moved in a direction toward the connection portion between the case 11 and the first band 12. The upper end of the digital content 61-2 may correspond to a third region 66 of the first band 12. The smart watch may generate tactile feedback in the third region 66, corresponding to the upper end of the digital content 61-2. When the digital content 61-2 is scrolled, the lower end of the digital content 61-2 may be moved in an opposite direction to the connection portion between the case 11 and the second band 13, that is, in a direction toward the buckle 62. The lower end of the digital content 61-2 may correspond to a fourth region 67 of the second band 13. The smart watch may generate tactile feedback in the fourth region 67 corresponding to the lower end of the digital content 61-2. The smart watch may determine a direction and speed when a region where tactile feedback is generated is moved so as to correspond to a direction and speed when digital content are moved.

A lower diagram of FIG. 6 illustrates a result obtained by further scrolling through digital content 61-3 that has been displayed as illustrated in the intermediate diagram of FIG. 6. When the digital content 61-3 is scrolled, an upper end of the digital content 61-3 may be displayed on an upper end region 68 of a display unit. The upper end of the digital content 61-3 is displayed on the display unit, and thus, a non-displayed portion of an upper end portion of the digital content 61-3 is not present. Thus, the smart watch may not generate tactile feedback on the first band 12.

When the digital content 61-3 is scrolled, the lower end of the digital content 61-3 may be moved in an opposite direction to the connection portion between the case 11 and the second band 13, that is, in a direction toward the buckle 62. The lower end of the digital content 61-3 may be moved to a region in which the buckle 62 is positioned. The smart watch may generate tactile feedback corresponding to the lower end of the digital content 61-3 in a region of the second band 13 although the lower end of the digital content 61-3 is moved to a region of the buckle 62 or the first band 12.

The smart watch may set a limiting region of tactile feedback on the second band 13 and generate tactile feedback only up to the limiting region although the lower end of the digital content 61-3 is moved to exceed the limiting region. Thus, the smart watch may generate tactile feedback in a fifth region 69 of the second band 13 so as to correspond to the lower end of the digital content 61-3. The limiting region of tactile feedback may be applied to the first band 12 and an upper end of digital content in a similar way. Thus, tactile feedback generated in the first band 12 and tactile feedback generated in the second band 13 may not overlap with each other.

Figure 7:
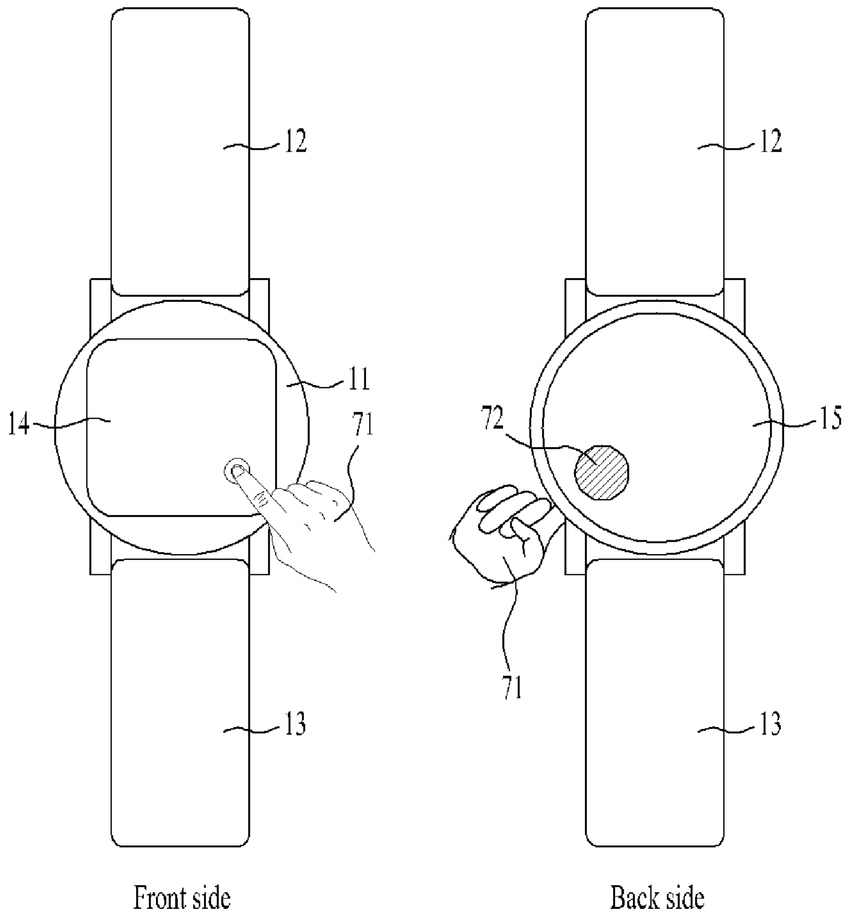
FIG. 7 is a diagram illustrating tactile feedback generated on a case back of a smart watch according to an embodiment of the disclosure.

FIG. 7 is a diagram illustrating tactile feedback generated on a case back of a smart watch according to an embodiment of the disclosure. The smart watch may detect control input generated by touching the display unit and generate tactile feedback in a region of the display unit, in which the control input is detected. The tactile feedback may be determined to correspond to the properties of a displayed portion of digital content. In addition, when pressure of the control input is equal to or more than threshold pressure, the smart watch may generate tactile feedback on the case back of the smart watch. The smart watch may generate tactile feedback on the case back so as to correspond to the region of the display unit, in which the control input is detected.

A left diagram of FIG. 7 illustrates a front side of the smart watch, and a right diagram of FIG. 7 illustrates a back side of the smart watch. In the left diagram of FIG. 7, the smart watch may display digital content on the display unit 14. The smart watch may detect control input 71 generated by touching the display unit 14 and control digital content displayed according to the control input 71. The smart watch may generate tactile feedback in the region of the display unit, in which the control input 71 generated by touching the display unit 14 is detected. When pressure at which the control input 71 is generated by touching the display unit 14 is equal to or more than threshold pressure, the smart watch may generate tactile feedback 72 on the case back 15 as illustrated in a right diagram of FIG. 7. The smart watch may adjust intensity of the tactile feedback 72 in proportion to the pressure of the control input 71. When the control input 71 is moved, the smart watch may move the tactile feedback 72 generated on the case back 15 according to the control input 71.

When digital content corresponds to a three-dimensional (3D) image, the smart watch may generate tactile feedback corresponding to the properties of a front surface of the 3D image on the display unit 14 and generate tactile feedback corresponding to the properties of a back surface of the 3D image on the case back 15 of the smart watch. In this manner, the smart watch may transfer tactile feedback corresponding to the properties of the front surface and back surface of the 3D image to the user's finger and wrist, respectively. Here, the properties of the front surface and back surface of the 3D image may include the texture, shape, size, and position of the 3D image.

Figure 8:
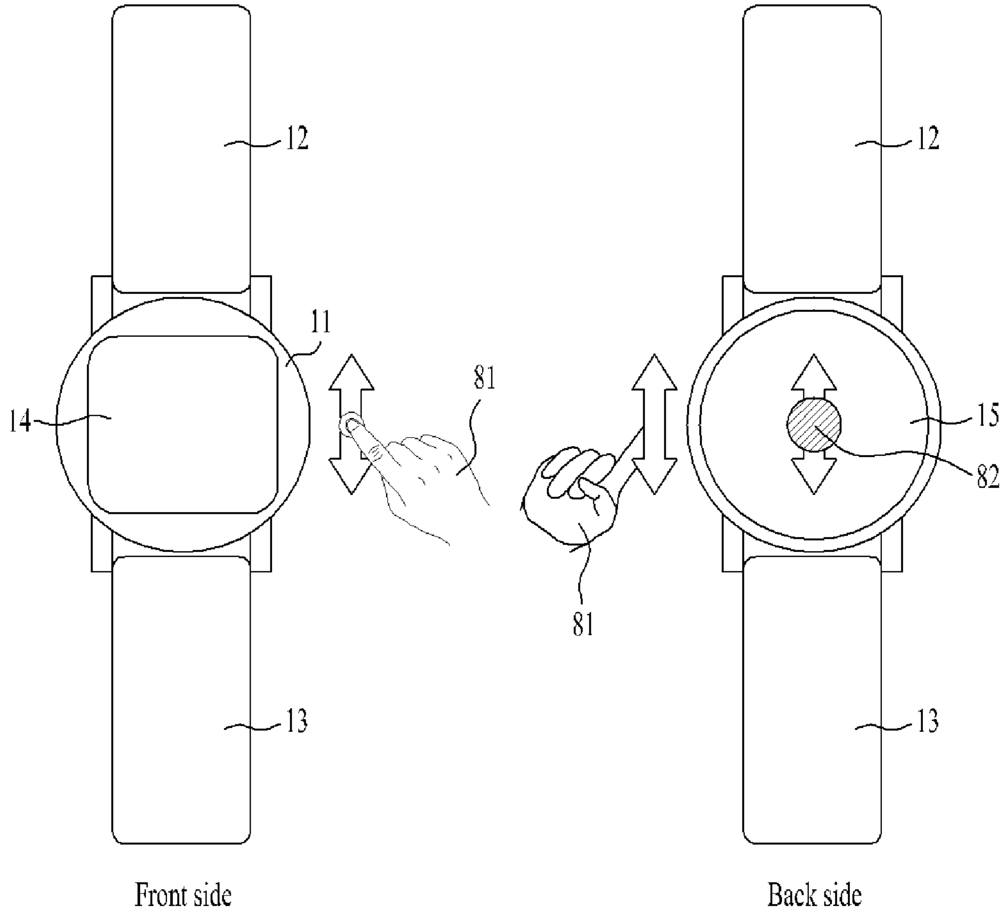
FIG. 8 is a diagram illustrating a method of controlling a smart watch using an adjacent region of a smart watch, according to an embodiment of the disclosure.

FIG. 8 is a diagram illustrating a method of controlling a smart watch using an adjacent region of the smart watch, according to an embodiment of the disclosure. In a left diagram of FIG. 8, the smart watch may detect control input 81 generated in the adjacent region of the smart watch as well as control input generated by directly touching the smart watch. Here, the adjacent region may include the user's wrist or back of hand. The smart watch may detect the control input 81 using at least one of a proximity sensor, an illumination sensor, a camera, and a motion sensor. The control input 81 may include gesture input. The smart watch may control digital content displayed on the display unit 14 in response to the control input 81. When the control input 81 is moved upward and downward in the adjacent region of the smart watch, the smart watch may scroll up and down through the displayed digital content.

In a right diagram of FIG. 8, the smart watch may generate tactile feedback 82 on the case back 15 in response to the control input 81 generated in the adjacent region of the smart watch. The smart watch may control the tactile feedback 82 generated on the case back 15 in response to the control input 81. When the control input 81 is moved up and down in the adjacent region of the smart watch, the smart watch may move the generated tactile feedback upward and downward. The smart watch may generate the tactile feedback 82 corresponding to the properties of the digital content displayed on the display unit 14 on the case back 15.

Figure 9:
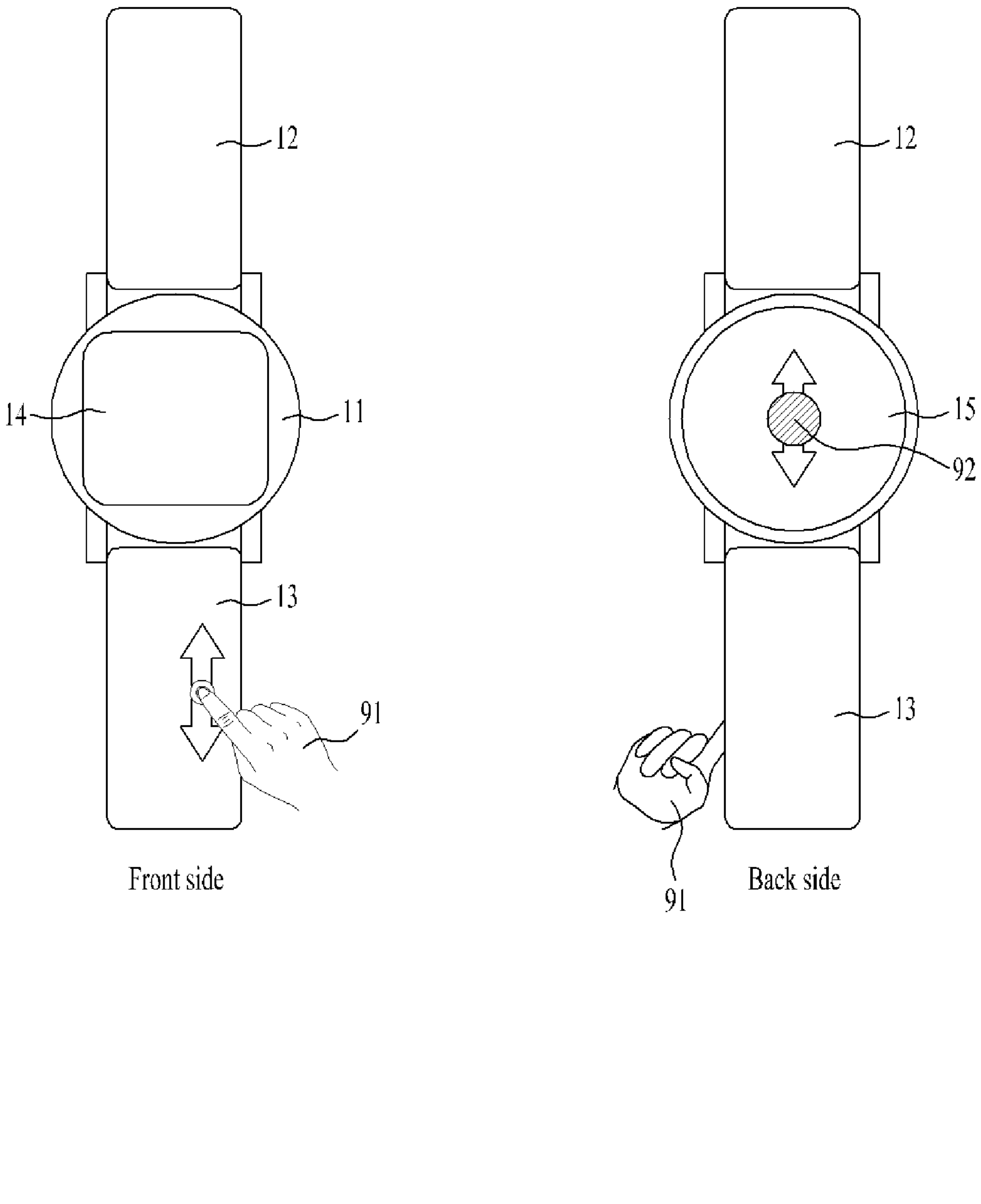
FIG. 9 is a diagram illustrating a method of controlling a smart watch using bands of a smart watch, according to an embodiment of the disclosure.

FIG. 9 is a diagram illustrating a method of controlling a smart watch using bands 12 and 13 of a smart watch, according to an embodiment of the disclosure. In a left diagram of FIG. 9, the smart watch may detect control input 91 generated by touching a front surface of each of the bands 12 and 13 as well as control input generated by touching a display unit. The smart watch may detect the control input 91 using at least one of a touch sensor, a proximity sensor, an illumination sensor, a camera, and a motion sensor. The smart watch may control digital content displayed on the display unit 14 in response to the control input 91 generated on the bands 12 and 13. When the control input 91 is moved up and down while in contact with the bands 12 and 13 of the smart watch, the smart watch may scroll up and down through displayed digital content. In addition, the smart watch may generate tactile feedback in a region in which the control input 91 is detected. Thus, although the user does not touch the display unit 14, the user may experience tactile feedback corresponding to the displayed digital content by touching a front surface of each of the bands 12 and 13.

In a right diagram of FIG. 9, the smart watch may generate tactile feedback 92 on the case back 15 in response to the control input 91 generated on the bands 12 and 13. The smart watch may control the tactile feedback 92 generated on the case back 15 in response to the control input 91. When the control input 91 is moved up and down while in contact with the bands 12 and 13 of the smart watch, the smart watch may move the generated tactile feedback. The smart watch may generate the tactile feedback 92 corresponding to the properties of digital content displayed on the display unit 14 on the case back 15.

Figure 10:
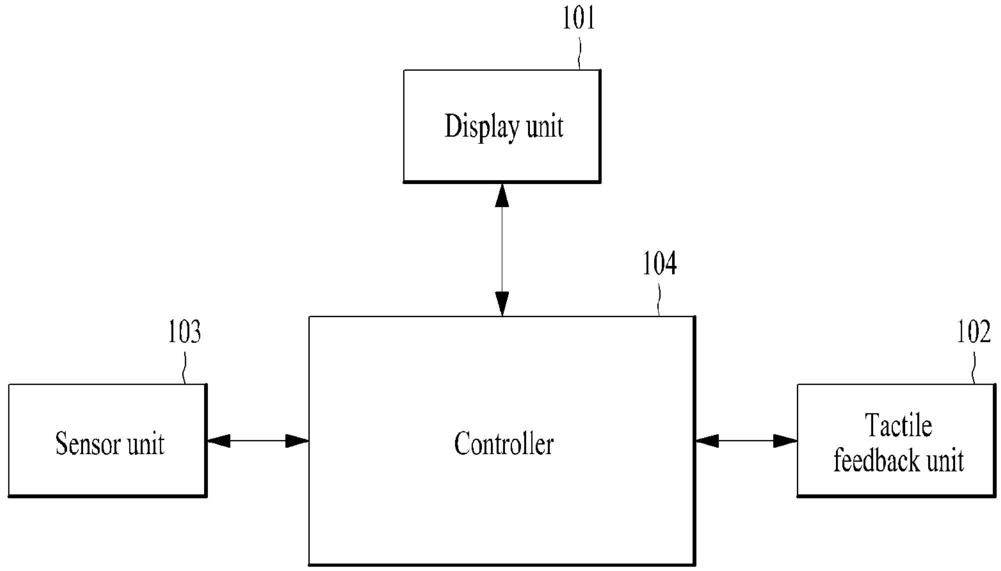
FIG. 10 is a block diagram of a smart watch according to an embodiment of the disclosure.

FIG. 10 is a block diagram of a smart watch according to an embodiment of the disclosure. The smart watch may include a display unit 101, a tactile feedback unit 102, a sensor unit 103, and a controller 104.

The display unit 101 may display digital content. In some embodiments, the display unit 101 may include at least one of an organic light-emitting diode (OLED) display, a liquid crystal display (LCD), an electronic ink display, and a flexible display. The display unit 101 may include a touch sensitive display unit to detect control input generated by touching the display unit 101. In addition, the display unit 101 may include a tactile display unit to transfer to a user tactile feedback generated by the tactile feedback unit 102 which will be described below.

The tactile feedback unit 102 may generate tactile feedback in response to control input. The tactile feedback unit 102 may generate tactile feedback in a region to which the control input is input or another region corresponding to the region to which the control input is input. The tactile feedback unit 102 may generate tactile feedback on at least one of the display unit 101 of the smart watch, a front or back surface of a band, and a case back. The smart watch may transfer tactile feedback to the user's finger or wrist. The user may sense the tactile feedback via tactile sensation and control digital content according to the sensed tactile feedback. In this disclosure, the smart watch may generate tactile feedback corresponding to a non-displayed portion of digital content as well as tactile feedback corresponding to a displayed portion of the digital content so as to notify the user of an entire region of the digital content.

A method of generating tactile feedback by the tactile feedback unit 102 for a user is now described. The tactile feedback unit 102 may transfer tactile feedback to the user's finger or the wrist of the user wearing the smart watch using a micro vibration actuator. The tactile feedback unit 102 may control a frequency and amplitude of vibration so as to adjust intensity of the tactile feedback transferred to the user's finger or wrist.

According to another embodiment of the disclosure, the tactile feedback unit 102 may generate micro current to transfer tactile feedback to the user. The tactile feedback unit 102 may control intensity of current and a period at which the current is generated such that the user may experience other touches.

In addition, the tactile feedback unit 102 may generate tactile feedback using ultrasonic resonance. The tactile feedback unit 102 may generate a plurality of ultrasonic waves and allow the ultrasonic waves to resonate on the user's finger or wrist to generate tactile feedback for the user. The tactile feedback unit 102 may generate tactile feedback on an adjacent region detected by the user's finger. The tactile feedback unit 102 may adjust amplitude of resonance frequency and a period at which resonance is generated to generate different tactile feedbacks.

The sensor unit 103 may sense control input that is input to the smart watch. The sensor unit 103 may sense the control input generated by touching a display unit or a front surface of a band. The sensor unit 103 may sense the control input of the user using a resistive or electrostatic touch sensor. Touch sensors for respective regions may be activated or deactivated by the controller 104 for the respective regions. The sensor unit 103 may transmit information regarding the sensed control input to the controller 104.

The sensor unit 103 may sense the control input that is input to the adjacent region of the smart watch. The sensor unit 103 may detect control input spaced apart from the smart watch by a predetermined interval using at least one of a proximity sensor, an illumination sensor, a camera, and a motion sensor. The control input may include gesture input.

The sensor unit 103 may sense pressure of the control input generated by touching the display unit 101. The sensor unit 103 may use a piezoelectric sensor or measure an area in which the control input is detected to sense the pressure of the control input.

The sensor unit 103 may transmit information regarding the sensed control input to the controller 104. In some embodiment, the aforementioned foldable display unit 101 and the touch sensor of the sensor unit 103 may be integrated with each other to constitute a touch sensitive display unit.

The controller 104 may control the display unit 101, the tactile feedback unit 102, and the sensor unit 103 using the information transmitted from the sensor unit 103. The controller 104 may display digital content on the display unit 101. The controller 104 may distinguish between a displayed portion and non-displayed portion of the digital content. The controller 104 may generate tactile feedback corresponding to the displayed portion of the digital content on the display unit 101 or a front surface of the band of the smart watch. In addition, the controller 104 may generate tactile feedback corresponding to the non-displayed portion of the digital content on a back surface of the band of the smart watch. Thus, the user may check the displayed portion of the digital content visually and through tactile sensation and check the non-displayed portion of the digital content through tactile sensation.

The controller 104 may generate tactile feedback on a back surface of a band, corresponding to upper and lower ends of the non-displayed portion of the digital content. The generated tactile feedback may be transferred to the user's wrist that contacts a region of the back surface of the band. The user may experience tactile feedback corresponding to the displayed portion of the digital content through the wrist and predict an area of the non-displayed portion of the digital content.

In addition, when pressure of the control input is equal to or more than threshold pressure, the controller 104 may generate tactile feedback on a portion of a case back, corresponding to a region in which the control input is detected. When the digital content corresponds to a 3D image, the controller 104 may generate tactile feedback corresponding to the properties of a front surface of the 3D image on the display unit 101 and generate tactile feedback corresponding to the properties of a back surface of the 3D image on a case back of the smart watch.

FIG. 10 is a block diagram of a smart watch according to an embodiment of the disclosure. In this regard, blocks formed by partitioning the smart watch are illustrated by logically partitioning the smart watch into elements of a foldable display device. Thus, the elements of the aforementioned foldable display device may be constituted as one chip or a plurality of chips according to design of the foldable display device.

Figure 11:
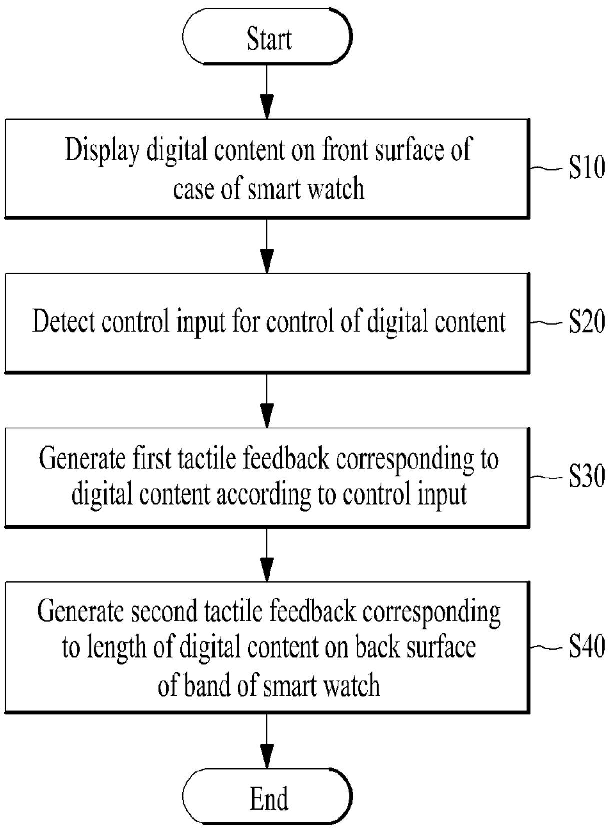
FIG. 11 is a flowchart of a method of controlling a smart watch according to an embodiment of the disclosure.

FIG. 11 is a flowchart of a method of controlling a smart watch according to an embodiment of the disclosure. The smart watch may display digital content on a display unit provided on a front surface of a case (S10). As described with reference to FIG. 2, the smart watch may display the digital content, an area of which exceeds that of the digital unit. The smart watch may display only a portion of digital content and display the remaining non-displayed portion by moving the digital content when scroll control input is input.

The smart watch may detect control input for control of the digital content (S20). As described with reference to FIGS. 7 through 9, the smart watch may detect control input from the display unit, a front surface of a band, or an adjacent region of the smart watch. The smart watch may control the displayed digital content according to the detected control input. When the user inputs the scroll control input in order to view the non-displayed portion of the digital content, the smart watch may scroll through the digital content.

The smart watch may generate first tactile feedback in response to the digital content according to the control input (S30). As described with reference to FIG. 7, the smart watch may generate the first tactile feedback according to the properties of digital content controlled according to the control input. When the control input is detected from the display unit, the smart watch may generate the first tactile feedback on the display unit. In addition, when the control input is detected from the front surface of the band, the smart watch may generate the first tactile feedback on the front surface of the band or the case back. In addition, when the control input is detected from the adjacent region of the smart watch, the smart watch may generate the first tactile feedback on the case back. A process of generating the first tactile feedback in response to the control input is not required, and thus, may be omitted in some embodiments.

The smart watch may generate second tactile feedback on a back surface of the band of the smart watch so as to correspond to the length of digital content (S40). As described with reference to FIGS. 3 through 5, the smart watch may determine positions of upper and lower ends of the digital content. The smart watch may measure the length of the displayed portion of the digital content as well as the length of the non-displayed portion of the digital content. Thus, the smart watch may perform a process for checking portions of bands of the smart watch, corresponding to the upper and lower bands of the non-displayed portion of the digital content, in consideration of a magnification ratio. The smart watch may determine a first region and a second region of the bands, corresponding to the upper and lower ends of the non-displayed portion of the digital content.

The smart watch may generate the second tactile feedback corresponding to the non-displayed portion of the digital content on the back surface of the band. The smart watch may generate the second tactile feedback from a connection portion between the band and an upper end of a case to the first region. In addition, the smart watch may generate the second tactile feedback from a connection portion between the band and a lower end of the case to the second region. In some embodiments, the smart watch may generate the second tactile feedback on only the first region and the second region.

When digital content is controlled, the smart watch may move a portion in which the second tactile feedback is generated, according to the controlled digital content. That is, when positions of the upper and lower ends of the non-displayed portion of the digital content are changed according to the control input, the smart watch may move the second tactile feedback to regions of the back surface of the band, corresponding to the changed positions, and generate the second tactile feedback.

Figure 12:
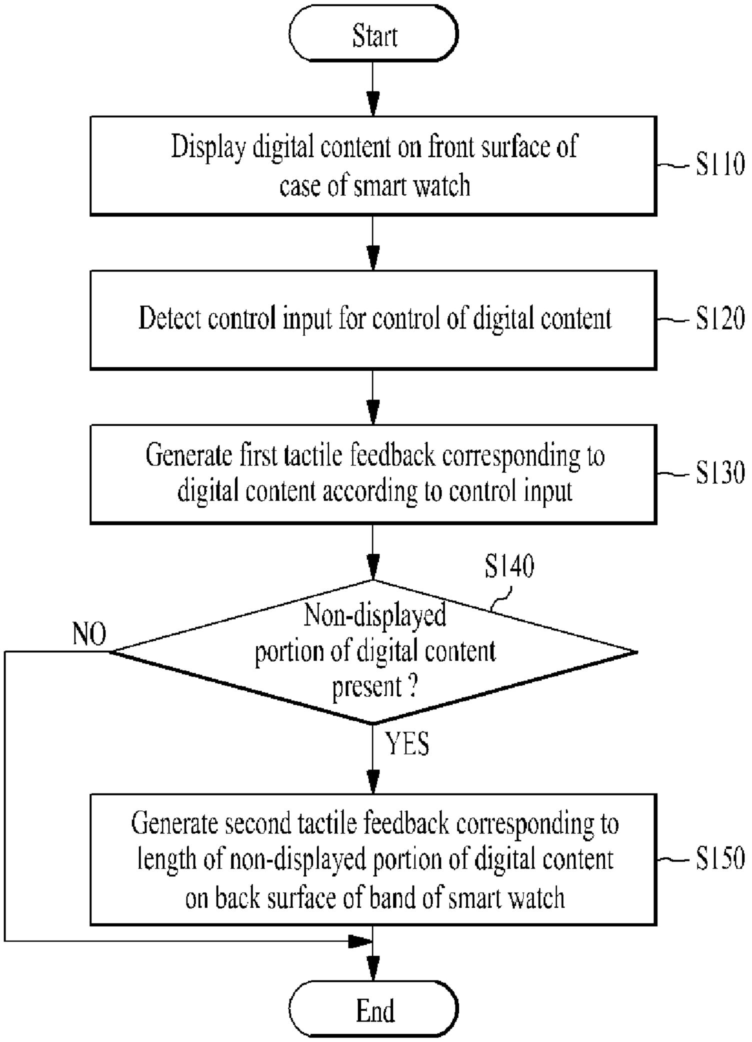
FIG. 12 is a flowchart of a method of controlling a smart watch according to another embodiment of the disclosure.

FIG. 12 is a flowchart of a method of controlling a smart watch according to another embodiment of the disclosure. The smart watch may display digital content on a display unit provided on a front surface of a case (S110). As described with reference to FIG. 2, the smart watch may display the digital content, a length of which exceeds that of the digital unit. The smart watch may display only a portion of digital content and display the remaining non-displayed portion by moving the digital content when scroll control input is input.

The smart watch may detect control input for control of the digital content (S120). As described with reference to FIGS. 7 through 9, the smart watch may detect control input on the display unit, a front surface of a band, or an adjacent region of the smart watch. The smart watch may control the displayed digital content according to the detected control input. When the user inputs the scroll control input in order to view the non-displayed portion of the digital content, the smart watch may scroll through the digital content.

The smart watch may generate first tactile feedback corresponding to the digital content in response to the control input (S130). As described with reference to FIG. 7, the smart watch may generate the first tactile feedback according to the properties of digital content controlled according to the control input. When the control input is detected from the display unit, the smart watch may generate the first tactile feedback on the display unit. In addition, when the control input is detected from the front surface of the band, the smart watch may generate the first tactile feedback on the front surface of the band or the case back. In addition, when the control input is detected from the adjacent region of the smart watch, the smart watch may generate the first tactile feedback on the case back. A process of generating the first tactile feedback in response to the control input is not required, and thus, may be omitted in some embodiments.

The smart watch may determine whether a non-displayed portion of the digital content is present (S140). When an area of the digital content is equal to or less than a resolution of a display unit included in the smart watch, the smart watch may display an entire portion of the digital contentions on the digital unit. In this case, since the non-displayed portion is not present, the second tactile feedback is not generated.

As described with reference to FIG. 2, when the area of the digital content exceeds the resolution of the display unit included in the smart watch, the smart watch may display only a portion of the digital content on the display unit. Thus, another portion of the digital content may not be displayed. Thus, the smart watch may determine that the non-displayed portion of the digital content is present. Then, in a subsequent step S150, the switch may generate the second tactile feedback on a back surface of the band.

The smart watch may generate second tactile feedback on the back surface of the band of the smart watch so as to correspond to the length of digital content (S150). As described with reference to FIGS. 3 through 5, the smart watch may determine positions of upper and lower ends of the digital content. The smart watch may measure the length of the displayed portion of the digital content as well as the length of the non-displayed portion of the digital content. Thus, the smart watch may perform a process for checking portions of bands of the smart watch, corresponding to the upper and lower bands of the non-displayed portion of the digital content, in consideration of a magnification ratio. The smart watch may determine a first region and a second region of the bands, corresponding to the upper and lower ends of the non-displayed portion of the digital content.

The smart watch may generate the second tactile feedback corresponding to the non-displayed portion of the digital content on the back surface of the band. The smart watch may generate the second tactile feedback from a connection portion between the band and an upper end of a case to the first region. In addition, the smart watch may generate the second tactile feedback from a connection portion between the band and a lower end of the case to the second region. In some embodiments, the smart watch may generate the second tactile feedback on only the first region and the second region.

When digital content is controlled, the smart watch may move a portion in which the second tactile feedback is generated, according to the controlled digital content. That is, when positions of the upper and lower ends of the non-displayed portion of the digital content are changed according to the control input, the smart watch may move the second tactile feedback to regions of the back surface of the band, corresponding to the changed positions, and generate the second tactile feedback.

As described above, the smart watch according to the disclosure may generate tactile feedback corresponding to a non-displayed portion of digital content as well as tactile feedback corresponding to a displayed portion of the digital content. In addition, in this manner, the smart watch may inform a user how long remaining non-displayed portions of digital content are present.

According to the disclosure, the smart watch may generate tactile feedback according to the properties of displayed digital content.

According to the disclosure, the smart watch may generate tactile feedback on a back surface of a band connected to a case.

According to the disclosure, the smart watch may generate tactile feedback according to the length of a non-displayed portion of digital content.

According to the disclosure, the smart watch may inform a user of the length of digital content.

According to the disclosure, the smart watch may detect touch input that is input to a display unit and generate tactile feedback corresponding to the touch input on a case back.

According to the disclosure, the smart watch may detect control input generated on an adjacent region of the smart watch.

According to the disclosure, the smart watch may move a portion in which tactile feedback is generated as displayed digital content is moved.

In addition, according to the disclosure, the smart watch may detect control input generated by touching a front surface of a band connected to a case and generate tactile feedback.

It will be apparent to those skilled in the art that various modifications and variations can be made in the disclosure without departing from the spirit or scope of the inventions. Thus, it is intended that the disclosure covers the modifications and variations of this invention provided they come within the scope of the appended claims and their equivalents.

What is claimed is:

1. A smart watch comprising:
- a case;
- a band connected to the case;
- a display unit provided on a front surface of the case and configured to display digital content;
- a sensor unit configured to detect control input for control of the digital content;
- a tactile feedback unit configured to generate a first tactile feedback on the display unit and a second tactile feedback on the band; and
- a controller configured to control the display unit, the sensor unit, and the tactile feedback unit,
- wherein the controller generates the second tactile feedback corresponding to a length of the digital content on a back surface of the band.

2. The smart watch according to claim 1, wherein:

the sensor unit detects the control input generated by touching the display unit of the smart watch; and the controller controls the digital content in response to the control input.

3. The smart watch according to claim 2, wherein the controller generates the first tactile feedback on the display unit in response to the displayed digital content when the control input is generated by touching the display unit.

4. The smart watch according to claim 3, wherein the controller moves the digital content in a first direction by a second distance when the control input is moved in the first direction by a first distance while in contact with the display unit.

5. The smart watch according to claim 4, wherein the controller moves the second tactile feedback generated on the back surface of the band to correspond to a length of a non-displayed portion of the digital content on the display unit when the digital content is moved according to the control input.

6. The smart watch according to claim 1, wherein:

the sensor unit detects the control input generated by touching a front surface of the band of the smart watch; and the controller controls the digital content in response to the control input.

7. The smart watch according to claim 6, wherein the controller generates the first, the second and/or a third tactile feedback when the control input is generated by touching the front surface of the band of the smart watch.

8. The smart watch according to claim 6, wherein the controller generates third tactile feedback on a back surface of the case in response to the control input when the control input is generated by touching the front surface of the band of the smart watch.

9. The smart watch according to claim 1, wherein the controller detects the control input to an adjacent region of the smart watch and generates third tactile feedback on a back surface of the case in response to the control input.

10. The smart watch according to claim 9, wherein the adjacent region of the smart watch comprises the user's wrist or back of hand.

11. The smart watch according to claim 1, wherein the second tactile feedback is generated to correspond to a length of a non-displayed portion of the digital content.

12. The smart watch according to claim 11, wherein, when the digital content is moved, the controller generates the second tactile feedback in a region of the band, corresponding to the non-displayed portion of the moved digital content.

13. The smart watch according to claim 11, wherein the second tactile feedback is generated on at least one of regions of the band, corresponding to upper and lower ends of the non-displayed portion of the digital content.

14. The smart watch according to claim 13, wherein a first band region corresponding to the upper end of the non-displayed portion of the digital content and a second band region corresponding to the lower portion of the non-displayed portion of the digital content do not overlap when the second tactile feedback is generated on the first band region and the second band region, respectively.

15. The smart watch according to claim 1, wherein:

the sensor unit further senses pressure of the control input with respect to the display unit; and the controller generates a third tactile feedback on a back surface of the case when the pressure of the control input exceeds threshold pressure.

16. The smart watch according to claim 15, wherein the controller controls intensity of the first, second, and/or third tactile feedback according to intensity of the pressure of the control input.

17. The smart watch according to claim 15, wherein the sensor unit senses intensity of the pressure of the control input based on an area of a portion from which the control input is detected.

18. The smart watch according to claim 1, wherein the second tactile feedback indicates a length of a non-displayed portion of the digital content.

19. The smart watch according to claim 1, wherein:

the digital content comprise a three-dimensional (3D) object; and the controller generates the first tactile feedback corresponding to texture of a front surface of the 3D object on the display unit and generates third tactile feedback corresponding to texture of a back surface of the 3D object on a back surface of the case when control input regarding the 3D object is detected.

20. The smart watch according to claim 1, wherein, when a region where the second tactile feedback is generated is moved, a moving direction and speed of the region correspond to a moving direction and speed of the digital content when the digital content is moved according to the control input.

21. The smart watch according to claim 1, wherein:

the band comprises a first part connected to an upper end of the case and a second part connected to a lower band of the case;

the smart watch further comprises a buckle connecting the first part and the second part to each other.

22. The smart watch according to claim 21, wherein the controller generates the second tactile feedback on both a back surface of the first part corresponding to an upper end of the digital content and a back surface of the second part corresponding to a lower end of the digital content.

23. The smart watch according to claim 21, wherein the controller does not generate the second tactile feedback on portions of the back surfaces of the first part and second part, which are adjacent to the buckle.

24. A method of controlling a smart watch comprising a case and a band connected to the case, the method comprising:

displaying digital content on a display unit provided on a front surface of the case;

detecting a length of a non-displayed portion of the digital content on the display unit; and generating a tactile feedback corresponding to the length of the non-displayed portion of the digital content on the display unit on a back surface of the band.

* * * * *